F. A. Lindal.
Churn.

No. 97,937. Patented Dec. 14, 1869.

Witnesses
Ch. L. F. Spencer
Geo. W. Miatt

Inventor.
F. A. Lindel.
By J. Fraser & Co.
Attys.

United States Patent Office.

F. A. LINDAL, OF STOCKTON, NEW YORK.

Letters Patent No. 97,937, dated December 14, 1869.

---

IMPROVEMENT IN CHURNS.

---

The Schedule referred to in these Letters Patent and making part of the same.

---

*To all whom it may concern:*

Be it known that I, F. A. LINDAL, of Stockton, in the county of Chautauqua, and State of New York, have invented a certain new and useful Improvement in Churns; and I do hereby declare that the following is a full and exact description thereof, reference being had to the accompanying drawings, making part of this specification, in which—

Figure 1:
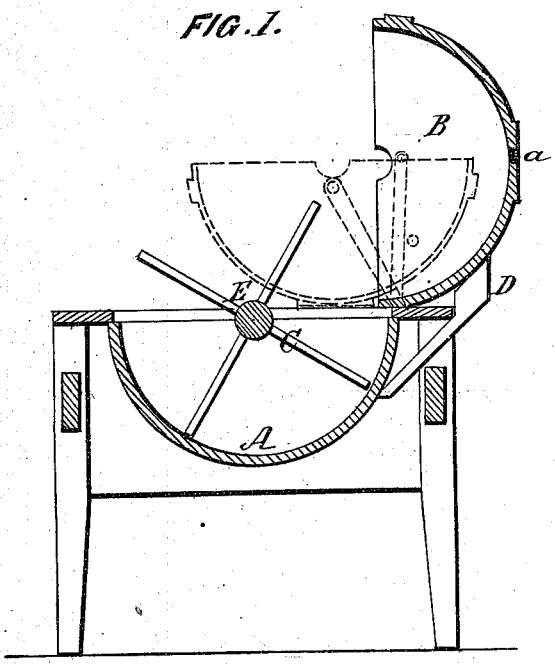

Figure 1 represents a sectional view of my improved churn, with the cover thrown partially open.

Figure 2:
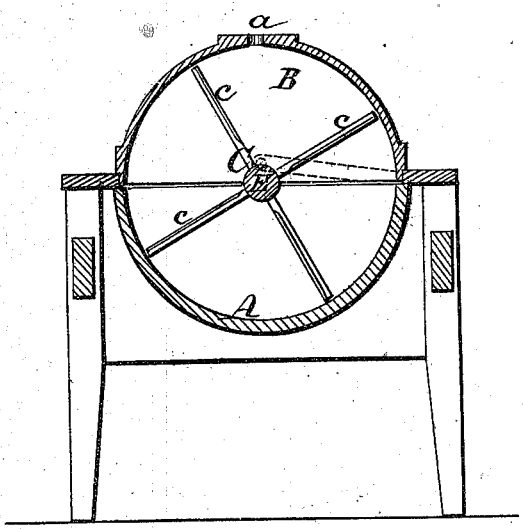

Figure 2, a cross-section of the same, with the cover closed.

Like letters of reference indicate corresponding parts in both figures.

My invention consists in combining with a churn, having a rotary dasher, a cover of dish-form, which, when turned over, serves as a receptacle for the butter, while it is being worked or otherwise manipulated.

In the drawings—

A represents the churn-body;

B, the cover; and

C, the rotary dasher.

The churn-body and cover combined, form a cylinder, and the cover is so hinged to the body as to turn over in an inverted position, thus serving as a receptacle for the butter in working, after churning, or otherwise handling.

A passage, *a*, is formed in the apex, which allows free escape of water or buttermilk from the interior.

In order to retain the cover in the half-open position, shown in the drawings, a bar or stop, D, is used, which rests between cross-pieces of the frame-work, and stands in such a position that the cover will strike it in the rear; the inside of the cover when open, affording a place to lay the butter, as it is taken out of the churn previous to being washed and worked.

The stop D also prevents the hinge from being bent or broken.

The dasher consists simply of a shaft, E, with crank, and paddles or floats *c c*.

These latter stand radially, and one edge of each is bevelled or chamfered off, as shown, the object of which is to work the cream from one end to the other of the churn, the bevelled edges throwing it off and outward, thus securing greater agitation of the cream.

When the cover is opened, the dasher can be removed, and the washing or working of the butter take place.

By the construction above described, the device answers the double purpose of a churn, and as a receptacle for the butter in working or otherwise, the cover serving this purpose by being turned over.

I am not aware that this effect has ever before been produced.

In working the butter, it is taken from the churn-body and placed in the unriveted cover, and allowed to drain, while the buttermilk is drawn from the churn.

It is then placed back in the churn-body, and subjected to the action of the dasher in pure water.

Its cheapness of construction and simplicity of form, and its double use as a churn and washer, render it a very desirable, useful, and valuable machine.

What I claim as my invention, and desire to secure by Letters Patent, is—

1. The body of a churn, constructed of two semi-cylindrical parts, one of which is so hinged to the other as to be swung over and form a receptacle for the butter, and likewise perforated at *a*, to allow the escape of milk and water, as and for the purpose described.

2. The bar D, fitted between cross-pieces of the frame-work, and arranged in relation to the hinged cover B, so as to support it when open in either a vertical or horizontal position, substantially as and for the purpose described.

In witness whereof, I have hereunto signed my name, in the presence of two subscribing witnesses.

F. A. LINDAL.

Witnesses:
J. R. DRAKE,
C. N. WOODWARD.